United States Patent [19]

Cichanowicz et al.

[11] Patent Number: 4,957,716

[45] Date of Patent: Sep. 18, 1990

[54] METHOD FOR REMOVAL OF $SO_2$ AND $NO_x$ FROM COMBUSTION GASES BY METAL CHELATION AND THERMAL REDUCTION

[75] Inventors: Joseph E. Cichanowicz, Sunnyvale; Patrick Maroney, Orinda, both of Calif.

[73] Assignee: Electric Power Research Institute, Inc., Palo Alto, Calif.

[21] Appl. No.: 274,514

[22] Filed: Nov. 21, 1988

[51] Int. Cl.$^5$ .................... C01B 17/00; C01B 21/00
[52] U.S. Cl. .................................... 423/235; 423/242
[58] Field of Search ................ 423/242 A, 242 R, 235

[56] References Cited

U.S. PATENT DOCUMENTS

| | | |
|---|---|---|
| 3,900,554 | 8/1975 | Lyon . |
| 3,991,161 | 11/1976 | Saitoh et al. ........................ 423/235 |
| 3,992,508 | 11/1976 | Saitoh et al. ........................ 423/235 |
| 4,036,943 | 7/1977 | Huron et al. . |
| 4,167,578 | 9/1979 | Mehta et al. . |
| 4,208,386 | 6/1980 | Arand et al. . |
| 4,235,852 | 11/1980 | Nomoto et al. ..................... 423/242 |
| 4,301,127 | 11/1981 | Goodstine et al. . |
| 4,325,924 | 4/1982 | Arand et al. . |
| 4,565,678 | 1/1986 | Fielke et al. . |
| 4,612,175 | 9/1986 | Harkness et al. ................... 423/235 |
| 4,708,854 | 11/1987 | Grinstead ............................ 423/235 |

FOREIGN PATENT DOCUMENTS

| | | |
|---|---|---|
| 3531398A | 3/1987 | Fed. Rep. of Germany . |
| 51-108682 | 9/1976 | Japan ................................... 423/242 |

*Primary Examiner*—Gregory A. Heller
*Attorney, Agent, or Firm*—Flehr, Hohbach, Test, Albritton & Herbert

[57] ABSTRACT

A process is provided for removing nitrogen oxides and sulfur dioxide from gaseous mixtures in the presence of a metal chelating agent. These gaseous contaminants are converted to hydroxylaminedisulfonates which are decomposed to ammonium ions and sulfate ions at pH of 4.2 or less. This decomposition step also converts the metal ion of the metal chelating agent to a reusable form. The ammonium ions are separated by column sorption, eluted and thermally reacted with nitrogen oxides to form nitrogen and water. The sulfate ions are removed as a sulfate salt precipitate.

11 Claims, 1 Drawing Sheet

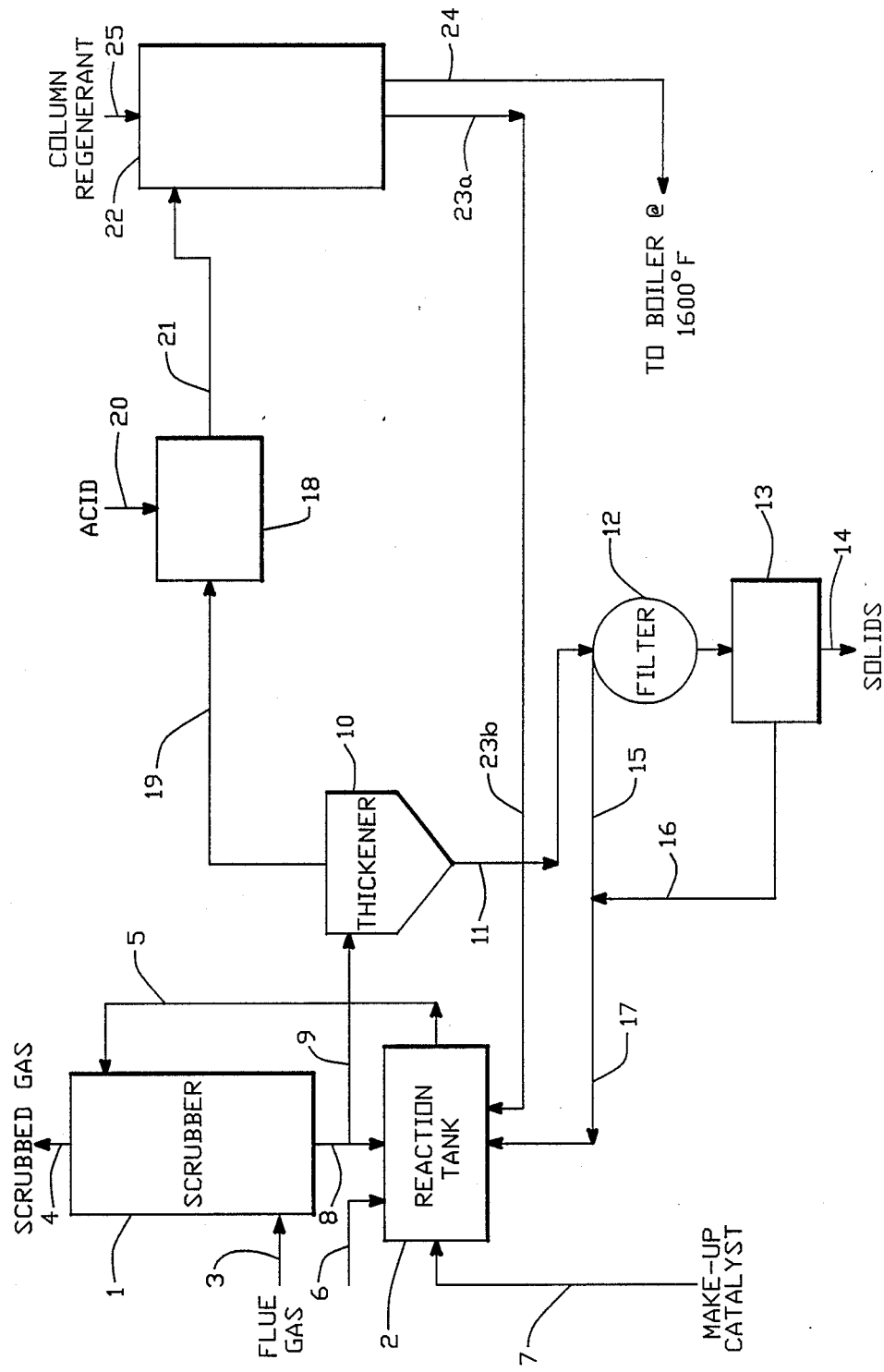

METHOD FOR REMOVAL OF SO₂ AND NO_x FROM COMBUSTION GASES BY METAL CHELATION AND THERMAL REDUCTION

The present invention is directed to a method for removing $NO_x$ and $SO_2$ from combustion gases before discharge into the atmosphere. In particular, the present invention relates to absorbing sulfur dioxide and nitrogen oxides with an aqueous slurry of a sorbent in the presence of a metal chelate catalyst, decomposing the product resulting from the catalytic reaction, and reusing the products of decomposition.

BACKGROUND OF THE INVENTION

There are sorbent materials, such as lime and limestone, which are conventionally used in scrubbers to remove $SO_2$ from gases. In one modification, an example of which is disclosed in U.S. Pat. No. 4,612,175, a metal chelating agent is added to the scrubber slurry, which promotes absorption of $NO_x$. The $NO_x$ is converted to $HNO_2$ and $HNO_3$ and at least some of the $SO_2$ is converted to $HSO_3^{31}$. Once in solution, the $HNO_2$ and $HSO_3^{31}$ form hydroxylaminedisulfonate ($HON(SO_3H)_2$, abbreviated HADS) and related compounds. However, an accumulation of the HADS compounds in the scrubber slurry causes problems in that it interferes with the disposal of process waters and solids and with the process chemistry. The problems are compounded in that HADS should be treated prior to disposal so as not to create an environmental problem.

An object of the present invention is thus to provide a method for removing $NO_x/SO_2$ from combustion gases using a metal chelate, while also during this process, converting $NO_x$ to a species which can be thermally reduced to nitrogen gas.

This and other objects of the invention will be apparent from the following description and from practice of the invention.

SUMMARY OF THE INVENTION

The invention provides a process for removal of sulfur dioxide and nitrogen oxides from a gas mixture comprising the steps of contacting a sorbent with a gas mixture containing sulfur dioxide and nitrogen oxides in a first reaction zone in the presence of a first aqueous mixture containing a metal chelating agent at a pH in the range of about 4.5 to 7.0 whereby the nitrogen oxides and sulfur dioxide form hydroxylaminedisulfonates and related compounds; then mixing at least a portion of the hydroxylaminedisulfonates in a second reaction zone in a second aqueous mixture at a pH of 4.2 or less, thereby producing an aqueous solution containing ammonium ions and sulfate ions; and contacting the second aqueous mixture containing ammonium ions with an ammonium ion-absorbing sorbent to remove ammonium ions from the second aqueous mixture. The resulting ammonium-free second aqueous mixture can then be treated to precipitate the sulfate ions. The ammonium ions may be desorbed from the ion-absorbing sorbent, converted to ammonia and reacted in a high-temperature environment with additional $NO_x$ to form nitrogen and water.

DESCRIPTION OF THE DRAWING

The drawing is a schematic of one embodiment of an air quality control system for removal of $SO_2$ and $NO_x$ from gases in accordance with the present invention

DESCRIPTION OF THE PREFERRED EMBODIMENT

The preferred embodiment of the present invention will be described in connection with the accompanying drawing but it will be understood that various modifications may be made based on the following description, which modifications are intended to be within the scope of the present invention.

In the following flow sheet shown in Scheme A, there is shown schematically how $NO_x$ and $SO_2$ are converted according to the present invention to a disposable solid sulfate salt and to nitrogen gas and water. While in Scheme A the metal chelating agent is designated as an Fe(II) EDTA and the final salt precipitate is shown to be a calcium sulfate, it will be understood that other equivalent iron chelating agents including, but not limited to, those described below and that other precipitable sulfate salts other than the calcium sulfate, may be utilized without departing from the spirit and scope of the present invention.

SCHEME A

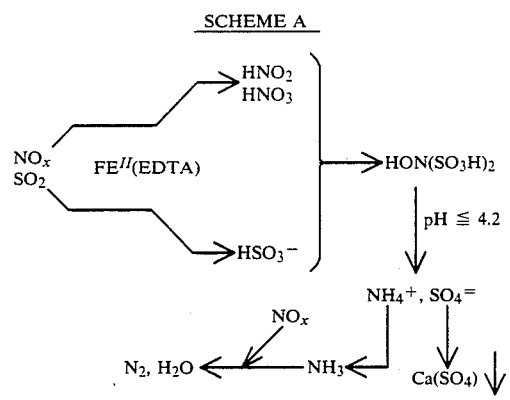

In the accompanying figure a scrubber 1 and reaction tank 2 containing the scrubber slurry or solution are shown. The gas mixture to be treated, such as a flue gas, is directed in a path defined by conduit 3 into the scrubber 1 and the scrubbed gas is withdrawn from the scrubber 1 through conduit 4. The gas mixture, indicated in the drawing as a flue gas, but not limited thereto, contains sulfur dioxide and nitrogen oxides which are to be removed. Scrubber 1 may be a conventional multiple stage absorber in which a slurry of sorbent such as lime/limestone, is brought into intimate contact with flue gases. Other scrubbers may also be used, such as those which are commercially available from General Electric Environmental Services or Combustion Engineering. A scrubber solution, or slurry, is directed into the scrubber 1 through conduit 5. Typically the scrubbing slurry will contain a sorbent such as limestone or lime, i.e., $CaCO_3$, $Ca(OH)_2$ and/or $CaSO_3$ for the absorption of $SO_2$ and $NO_x$, and some calcium sulfate solids to promote seed crystallization and to avoid scaling. Typically liquid slurry-to-gas ratios of 25 to 125 gallon per 1000 cfm are utilized in the scrubber to achieve absorption. The solids content of the slurry is typically in the range of 5 to 15% solids.

The slurry is typically prepared in the reaction tank 2 and the various components, such as the sorbent, water, and a metal chelate may be conducted into tank 2 through conduit 6. Suitable metal chelating agents which are added to the slurry to catalyze the production of HADS polyamines such as hexamethylenetetraamine (HMTA), ethylenediamine, diethylenetriamine, triethylenetetraamine; polyaminopolycarboxylic acids, such as ethylenediaminetetraacetic acid (EDTA), N-(2-hydroxyethyl) ethylenediamine-N,N,,N,-triacetic acid (HEEDTA) and polycarboxylic acids such as citric acid. Suitable metal ions include Fe(II), Zn(II), Ni(II), Co(II) and Al(III). A particularly preferred chelating agent is Fe(II) EDTA. In this reaction, Fe(II) is oxidized to Fe(III). The quantity of active metal chelate will typically be in the range of 0.05 to 1.5 gram mole per liter of slurry of preferably about 0.07 gram moles per liter. A scrubber slurry or solution may contain more than one type of chelating agent. Disclosure of preferred metal chelates for the removal of $SO_2$ and $NO_x$ from combusting gases and preparation thereof may be found in U.S. Pat. No. 4,612,175, the disclosure of which is incorporated herein by reference in its entirety. Other organic ligands may be added to the scrubber solution or slurry which act as antioxidants, such as citric acid, ascorbic acid or salicylic acid. These antioxidants may be used in small amounts such as from 0.05 to 1.5 gram moles per liter of slurry.

The pH of the scrubber solution or slurry must be maintained in the range of 4.5 to 7, preferably from 5 to 6.5, and the pH can be readily maintained by monitoring the scrubber solution or slurry in the reaction tank 2. The temperature of the scrubber slurry or solution in tank 2 is typically maintained within the range of 25° to 75° C., typically around 50° C.

Metal chelating agent (the catalyst) can be replenished in the reaction tank through conduit 7. The slurry or solution from the scrubber 1 drops from the scrubber 1 into the reaction tank 2 via conduit 8 from which a bleed stream is taken through conduit 9. Alternatively, scrubber 1 and reaction tank 2 may be the same vessel, in which case bleed stream 9 comes from conduit 5. If the $NO_x/SO_2$ sorbent utilized is a calcium salt, the material in the bleed line 9 will comprise mostly calcium sulfate, calcium sulfite and HADS. This bleed stream is placed in thickener 10 wherein a relatively viscous mixture of high solid contents (usually on the order of 30% or higher) is discharged through conduit 11 to a filter or other dewatering device, preferably a vacuum filter 12, which concentrates the solids approximately to the order of 50%. The solids mixture may be passed on to a washer 13. The final solids, mostly calcium sulfate and calcium sulfite, are discharged through conduit 14 while the clear filtrate from filter 12, containing some chelating agent, is conducted by conduit 15 to mix with the wash water from conduit 16 for return to the reaction tank 2 through conduit 17.

Liquid overflow from the thickener 1 is directed to acidifier 18 through conduit 19 where acid is added through conduit 20 to adjust the pH to approximately 4.2 or lower, preferably at about 4.0. A dilute acid such as sulfuric acid may be used for this purpose. The lowering of the pH to 4.2 or lower causes the HADS to decompose to ammonium ions and sulfate ions. By this acidification, Fe(III) will be reduced to Fe(II), making it available for recycling. The liquor from acidifier 18 is conducted via conduit 21 to column 22 which contains a sorbent, such as clinoptilolite, a naturally occurring zeolite, which preferentially adsorbs ammonium ions. As the clear solution from line 21 is passed through the column 22, the resulting filtrate, which now is ammonium free, and contains some metal chelate, is returned via conduits 23A and 23B to the reaction tank 2 where a substantial portion of the sulfate ions will eventually become processed into solids as described above and be removed through conduit 14. The amount of the sorbent utilized in the column 22 will of course depend upon the volume intended for one pass of fluid through the column, the expected concentration of ammonium ions in that volume, and other usual factors considered in column make-up by to those of ordinary skill in the art. Once the sorbent in column 22 is saturated or near saturated with ammonium ions and the filtrate in the column is removed through line 23, line 23A will be closed and conduit 24 will be opened. The column will then be regenerated by any number of regenerating agents such as aqueous NaOH, Ca(OH)$_2$ or other basic solutions, by passing the regenerant through the column via conduit 25. It is preferred that the regenerant be utilized such that the ammonium ions are removed from the column and converted to ammonia. A useful ammonia concentration in the eluent passing through line 24 is about 1 to 2 M ammonia. Lower concentrations of ammonia will be useful in this process but $NO_x$ conversions will not be as efficient as with a 1-2 molar concentration. This ammonia stream may then be subjected to reaction with $NO_x$ by injection into the flue gas downstream of the boiler where the temperature is approximately 1600° F. (or higher, preferably up to about 1800° F.). At these temperatures the ammonia is oxidized and $NO_x$ is reduced to produce nitrogen and water (thus disposing of an end product of the metal chelating process). The processes and conditions for thermal reduction of $NO_x$ are well known in the art and are disclosed, for example, in U.S. Pat. Nos. 4,208,386 and 4,325,924, the disclosures of which are incorporated herein by reference in their entirety.

It will be realized that various modifications to the above described preferred embodiment may be made without departing from the spirit and scope of the invention. For example, the conduit 21 may be split so that there is an ability to feed a plurality of columns 22 in seriatim so that there is no down time while one column is being regenerated. In this manner there will be a continuous flow throughout the system. Another way to make the process continuous is to use the acidifier 18 as a holding tank for fluids continuously streaming through line 19 while the sorbent in column 22 is being regenerated.

As many possible embodiments may be made of the invention without departing from the scope thereof, it is to be understood that all matter herein set forth or shown in the accompanying drawing is to be interpreted as an illustration and not in the limiting sense.

What is claimed is:

1. A process for removal of sulfur dioxide and nitrogen oxides from a gaseous mixture comprising the steps of
    (a) contacting in a first reaction zone a gas mixture containing sulfur dioxide and nitrogen oxides with a first aqueous mixture at a pH in the range of about 4.5 to 7, said first mixture comprising a first sorbent suitable for removing of sulfur dioxide and nitrogen oxides from said gas mixture, in the presence of a metal chelating agent to convert said nitrogen oxides and sulfur dioxide to hydroxylaminedisulfonate and withdrawing said first aqueous mixture from said first reaction zone;
    (b) mixing at least a portion of said hydroxylaminedisulfonate in a second reaction zone in an aqueous environment of a pH of 4.2 or less, thereby converting said hydroxylaminedisulfonate to ammonium ions and sulfate ions in a second aqueous solution;

(c) contacting said second aqueous solution with a second ammonium ion-absorbing sorbent suitable for removing ammonium ions from said second aqueous solution and separating said second sorbent from said second aqueous solution;

(d) eluting said second sorbent and exposing the eluted ammonium ions or ammonia to nitrogen oxides at a temperature sufficient to form nitrogen and water therefrom.

2. A process according to claim 1 further comprising the step of recycling said metal chelating agent into said first reaction zone.

3. A process according to claim 1 further comprising the step of removing said sulfate ions from said second aqueous solution by forming a sulfate salt precipitate 4. A process according to claim 3 wherein said precipitate comprises calcium sulfate.

5. A process according to claim 1 wherein said first sorbent comprises lime or limestone.

6. A process according to claim 1 wherein said second sorbent comprises clinoptilolite.

7. A process according to claim 1 wherein said chelating agent is selected from the group consisting of metal ion polyamines, polyaminopolycarboxylic acids, and polycarboxylic acids.

8. A process according to claim 7 wherein said chelating agent comprising Fe(II) EDTA.

9. A process according to claim 1 wherein said step (d) comprises introducing said eluted ammonia or ammonium ions into a nitrogen oxide-containing zone at a temperature of at least 1600° F.

10. A process according to claim 1 wherein in said step (b) the metal ion of said metal chelating agent is reduced, further comprising the step of recycling said metal ion from step (b) for re-use in step (a).

11. A process according to claim 10 wherein said metal chelating agent comprises Fe(II) EDTA, and said metal ion is reduced from Fe(III) to Fe(II) in said step (b).

* * * * *